United States Patent [19]
Robbart

[11] 3,856,558
[45] Dec. 24, 1974

[54] TREATMENT OF CELLULOSE

[76] Inventor: Edward Robbart, 321 Fairmount Ave., Milton, Mass. 02186

[22] Filed: Aug. 8, 1973

[21] Appl. No.: 386,622

Related U.S. Application Data

[63] Continuation-in-part of Ser. No. 308,057, Nov. 20, 1972, abandoned, which is a continuation-in-part of Ser. No. 39,538, May 21, 1970, abandoned, which is a continuation-in-part of Ser. No. 522,366, Jan. 24, 1966, abandoned.

[52] U.S. Cl. ......... 117/106 R, 117/143 R, 117/144, 117/154
[51] Int. Cl. ............................................ C23c 11/00
[58] Field of Search ............ 117/106 R, 143 R, 144, 117/154

[56] References Cited
UNITED STATES PATENTS

| | | | |
|---|---|---|---|
| 2,306,222 | 12/1942 | Patnode .......................... | 117/106 R |
| 2,386,259 | 10/1945 | Norton.............................. | 117/121 |
| 2,412,470 | 12/1946 | Norton............................. | 117/106 R |
| 2,961,338 | 11/1960 | Robbart............................. | 117/55 |
| 2,995,470 | 8/1961 | Robbart........................... | 117/106 R |

FOREIGN PATENTS OR APPLICATIONS

| | | | |
|---|---|---|---|
| 116,470 | 2/1943 | Australia............................ | 117/121 |

*Primary Examiner*—Ralph S. Kendall
*Assistant Examiner*—Harris A. Pitlick
*Attorney, Agent, or Firm*—Larson, Taylor and Hinds

[57] ABSTRACT

Cellulosic materials are rendered water repellent by contacting a cellulosic material having a water content between about 2 and 7 weight percent with vapors of a lower alkyl silicon halide which reacts with water to form a siloxane and maintaining the cellulosic material and lower alkyl silicon halide in contact between about 0.1 and 8 seconds. The concentration of lower alkyl silicon halide and the temperature at which the contact is conducted are maintained so that the cellulosic material contacted with the lower alkyl silicon halide is rendered water repellent and has a pH greater than 2.5. The contact of cellulosic material and lower alkyl silicon halide can be conducted in the presence of a vaporous inert solvent for the lower alkyl silicon halide. The process eliminates the need for a subsequent step for neutralizing hydrogen halide formed as a by-product of the reaction.

20 Claims, No Drawings

TREATMENT OF CELLULOSE

REFERENCE TO RELATED APPLICATIONS

This application is a continuation-in-part of application Ser. No. 308,057, filed Nov. 20, 1972 and now abandoned which in turn is a continuation-in-part of application Ser. No. 39,538, filed May 21, 1970 and now abandoned which in turn is a continuation-in-part of Ser. No. 522,366, filed Jan. 24, 1966 and now abandoned.

BACKGROUND OF THE INVENTION

This invention relates to the treatment of cellulosic materials, such as paper, with an organo silicon halide to impart water repellency and other desirable properties to the treated material.

It has long been known that material treated with organo silicon halides may be rendered water repellent, apparently through the formation of a siloxane deposit which is formed by a reaction between the halide and adsorbed surface moisture and/or hydroxyl or other reactive groups. In the treatment, hydrogen halide is generated as a reaction by-product. It is also known that paper, cloth and related materials may be made abhesive, or given "release" or non-sticking properties, by treatment with organo silicone reagents in such a way as to produce a silicon-containing layer on the surface of the material. This treatment may also produce hydrogen halide as a by-product.

In these prior art treatments, the cellulosic material has been contacted with the organo silicon halide either in liquid or vapor form. However, the conditions under which these prior art treatments have been conducted require that the treated cellulosic material be further treated to neutralize the hydrogen halide by-product formed by the reaction of the organo silicon hallide with water or hydroxyl groups. Heretofore, the treatment of cellulosic materials to obtain these and other possible benefits has required that the treated material be neutralized immediately after exposure to the organo silicon halide by immersion in an aqueous alkaline medium. Consequently it has not been practical to treat material such as paper with an organo silicon halide because of its unsuitability to a subsequent neutralization step in an aqueous medium. The suggestion has been made to neutralize the hydrogen halide by means of an ammonia atmosphere, but this results only in the formation of ammonium chloride which is itself acidic and causes degradation of the cellulose. Other processes for waterproofing paper are of course available, but none offers the ease and economy of a simple treatment of exposing the paper to a treating atmosphere. Accordingly, it would be highly desirable to provide a process for rendering cellulosic materials, particularly paper, water repellent with an organo silicon halide while retaining the strength characteristics of the paper and while eliminating the need for a subsequent treating step whereby the hydrogen halide is neutralized.

SUMMARY OF THE INVENTION

The present invention is based upon the discovery that cellulosic material, particularly paper, can be contacted with an organo silicon halide to render the material water repellent while retaining the strength characteristics of the material and eliminating the need for a subsequent neutralization step by controlling the moisture content of the material being contacted and by controlling the contact time of the material and the organo silicon halide within a very short contact time. In accordance with the present invention it has been found that these desirable results are obtained when the cellulosic material has a moisture content of between about 2 and about 7 weight percent and the contact time of the material with the organo silicon halide is between about 0.1 and 8 seconds. It has been found by operating within these limits, the cellulosic material is rendered water repellent and its pH can be controlled so that it is above 2.5. In preferred embodiments, the organo silicon halide vapor is mixed with a solvent for the organo silicon halide in vapor form and/or the cellulosic material obtained from the organo silicon halide contacting step is treated immediately to remove gaseous hydrogen halide such as by heating the treated cellulosic material or by contacting the treated cellulosic material with a moving gas stream.

DESCRIPTION OF SPECIFIC EMBODIMENTS

The cellulosic material contacted with the organo silicon halide in accordance with this invention must have a moisture content of between about 2 and about 7 weight percent, preferably between about 4 and 6 weight percent. It has been found that at least about 2 weight percent moisture must be present in the cellulosic material in order to effect the reaction therewith with the organo silicon halide to form the siloxane deposit. On the other hand, if the cellulosic material contains moisture in a concentration above about 7 weight percent, the hydrogen halide gaseous by-product of the reaction will become dissolved in the water thereby forming an acidic solution of the hydrogen halide which reacts with the cellulosic material and degrades it by discloration and by seriously reducing the strength characteristics of the cellulosic material. In addition, it is essential that the contact time of the cellulosic material and the organo silicon halide be maintained within the range of above 0.1 to 8 seconds, preferably between 0.5 and 1.5 seconds in order to prevent excessive deposition of hydrogen halide by-product in the cellulosic material. Other reaction conditions including temperature and organo silicon halide concentration are maintained so as to prevent the pH of the treated cellulosic product to be rendered below about 2.5 and preferably not below about 3.5. It has been found that when conducting the contacting step outside of the moisture range and contact time range set forth above, that the resultant product, if not neutralized, will have a pH below about 2.5 and that the acid present in the cellulosic material at these low pHs will degrade it. Of course, the final pH of the paper obtained is dependnt upon the initial pH of the paper prior to contact with the organo silicon halide. Within the ranges set forth above it is preferred that the other conditions maintained during the contacting step be such as to form a product which has a pH above about 3.5 in order to retain substantially all of the strength characteristics and the color characteristics of the final cellulosic material. It is to be understood that the contacting step can be conducted so that the organo silicon halide contacts either one or all surfaces of the cellulosic material.

The suitable organo silicon halides useful in this process are those commonly employed in water repellency treatments for cellulosic materials, such as those described by Patnode in U.S. Pat. No. 2,306,222, Norton, U.S. Pat. No. 2,412,470, and in my earlier U.S. Pat. Nos. 2,782,090; 2,824,778 and 2,961,338 which are incorporated herein by reference. Particularly suitable organo silicon halides are the lower alkyl silicon halides such as methylchlorosilanes, ethylchlorosilanes, butyl-chlorosilanes and propylchlorosilanes.

Typically, however the silicon halides will be a mixture of dimethyldichlorosilane, $(CH_3)_2 SiCl_2$; methyldichlorosilane, $CH_3 Si H Cl_2$; and methyltrichlorosilane, $CH_3 Si Cl_3$ which may contain silicon tetrachloride, $Si Cl_4$. The trihalogenated organo silicon halides provide more reactive cites for forming the siloxane but also evolve more hydrogen halide per mole of organo silicon halide during the reaction as compared with dihalogenated or monohalogenated organo silicon halides. Thus, generally, the conditions under which the reaction is conducted are less severe when employing relatively highly halogenated organo silicon halides having relatively low halogen substitution so that the pH of the treated cellulosic material is maintained above about 2.5.

The temperature at which the reaction is conducted is sufficiently high to effect siloxane formation within the contact time set forth above but not so high as to either degrade the paper by carbonization or to effect the formation of excessive hydrogen halide at the contact times employed. Suitable temperatures range from ambient room temperature to about 180°F. Generally, when employing higher temperatures, shorter contact times are employed and conversely, when employing relatively low temperatures, longer contact times can be employed. Furthermore, the concentration of the organo silicon halide in the atmosphere through which the cellulosic material is passed can be varied up to the saturation level of the atmosphere for the organo silicon halide and, if employed, a solvent for the organo silicon halide. The concentration of the organo silicon halide can range up to the saturation level of the atmosphere but should not be so low as to require contact times outside the ranges set forth above in order to effect the desired reaction and to render the cellulosic material water repellent. Typically, the concentration of the organo silicon halide ranges from about 1 volume percent up to the saturation level of the atmosphere within the contact chamber.

In a preferred embodiment of this invention, the cellulosic material is contacted with the vaporized organo silicon halide and a vaporized solvent for the organo silicon halide which solvent is inert both to the organo silicon halide and the paper being treated. It has been found that the presence of the solvent during the treatment step results in the formation of a treated cellulosic material having a higher pH as compared with a cellulosic material which is treated with the same organo silicon halide without the solvent under equivalent reaction conditions. Representative suitable solvents include toluene, xylene, hexane, perchloroethylene, fluorinated hydro-carbons, or other non-reactive solvents in which the organo silicon halide may be dissolved. I have found that as little as 10 mole percent solvent is effective but that larger concentrations of the solvents in the range of about 12 to 100 mole percent based upon the total mole of the organo silicon halide and solvent are preferred. A molar quantity ten times or more that of the organo silicon halide is effective. If desired, higher concentrations of the solvent can be employed. However, the presence of excessive concentrations of solvent effects a reduction of reaction rate and increases the expense of the solvent without a significant beneficial effect.

The organo silicon halide or the mixtures of vapors organo silicon halide in solvent may be formed by bubbling air through the liquid organo silicon halide and solvent or more simply by dropping the liquid of the desired composition slowly onto a hot plate to generate vapors of the same molar composition as the liquid. Alternatively, an aerosol mixture may be employed as described in my U.S. Pat. No. 2,824,778 which is incorporated herein by reference. When employing a solvent having a significantly different vapor pressure than the organo silicon halide and when effecting vaporization by bubbling air, it is preferred that the solvent and organo silicone halide be maintained as separate liquids in order to better control the composition of the vapors formed in the treating chamber.

The air to be mixed with the organo silicon halide in the treatment step should contain as little water as possible to avoid significant reaction of water in the air with the organo silicon halide which results in formation of hydrogen halide and reduction of the amount of organo silicon halide that can react on the surface of the cellulosic material.

If the moisture content of the cellulosic material to be treated is greater than about 7 weight percent, a drying step prior to the treatment with organo silicon halide is employed. The drying step need only be conducted at a temperature and a time sufficient to remove part of the surface moisture from the material while retaining at least about 2 weight percent moisture in the material. Heating to about 250°F for from about 3 to 5 seconds is sufficient in most cases. The desirability or necessity of this step will depend upon such factors as the prevailing humidity on the day of treatment, the uptake of moisture by the material during manufacture and storage and the conditions of treatment.

In a second preferred embodiment, the cellulosic material treated with organo silicon halide, either in the presence of or in the absence of a solvent, is further treated, upon removal from the organo silicon halide treating step, to remove hydrogen halide gas formed as a by product of the reaction prior to a substantial portion of it becoming dissolved by moisture in the cellulosic material. Generally, the hydrogen halide gas removal can be effected by heating the treated cellulosic material to a relatively high temperature in the order of about 200° to 275°F such as by passing the paper through an oven or oven heated rolls, and/or by passing the treated cellulosic material in contact with a dry moving gas stream such as air.

The following examples illustrate the present invention and are not intended to limit the same.

EXAMPLE I

Crepe Kraft paper having a moisture content of 7.99% by weight is treated by first running the web of the paper through an oven maintained at about 300°F with a dwell time of about three seconds to reduce the moisture content to about 5% by weight. The predried paper then was passed continuously through a chamber to which is supplied vapors composed of a mixture of 70 weight percent of methyltrichlorosilane, 20 weight percent of dimethyldichlorosilane and 10 weight percent methyldichlorosilane in toluene. The toluene comprised 20 percent by volume of the total composition supplied to the chamber. On a molar basis the toluene comprises about 22 molar percent of the composition added to the chamber. The silane reactants are supplied at a weight rate of about one percent of the weight of the paper and the dwell time of the paper in the chamber is about six seconds in an atmosphere comprising about 2 volume percent of the silane and toluene at room temperature. Following the emergence of the paper from the treating atmosphere the paper is passed adjacent radiant heaters to increase the paper surface temperature to about 200°F or more. Simultaneously, a blast of air is directed against one or both sides of the paper to remove vaporous reaction byproducts from the paper. The paper is found to have a thoroughly water-repellent surface without further treatment and had retained substantially all of its original strength characteristics.

EXAMPLE II

The same procedure set forth in Example I was followed except that the crepe paper was not predried. The product obtained was unacceptable in that the paper was embrittled at the edges and was discolored. The edges broke away when touched.

EXAMPLE III

Semibleached Kraft paper having a moisture content of 5.5% by weight was passed continuously through a chamber to which is supplied vapors composed of a mixture of 70 weight percent of methyltrichlorosilane, 20 weight percent of dimethyldichlorosilane and 10 weight percent methyldichlorosilane in toluene. The toluene comprised 20 percent by volume of the total composition supplied to the chamber. On a molar basis the toluene comprises about 22 molar percent of the composition added to the chamber. The silane reactants were vaporized by being injected into the chamber as an aerosol. In order to vary the contact time of the paper, the paper was supplied to the chamber at varying rates. After each run, the pH of the paper was determined by the method approved by the Standard Committee of TAPPI, method number T435 ts-52, entitled "Hydrogen Ion Concentration (pH) of Paper Extracts", except that the measurements were taken from 10 gram samples in 100 ml. of distilled water. The chamber was maintained at room temperature and the silane and toluene comprised about 2 volume percent of the atmosphere in the chamber. Following emergence from the chamber, the paper was passed through an oven to increase the paper surface temperature to about 200°F. The results are shown in Table I.

TABLE I

| Paper Rate, Ft./Min. | Dwell Time, Sec. | pH of Final Paper |
| --- | --- | --- |
| 100 | 4.5 | 4.5 |
| 200 | 2.25 | 4.8 |
| 300 | 1.5 | 4.5 |
| 400 | 1.125 | 4.9 |
| 500 | .9 | 5.0 |

As shown by Table I, paper having a satisfactory pH was obtained when employing dwell time in the reaction chamber varying from 0.9 sec. to 4.5 sec.

EXAMPLE IV

Semibleached Kraft paper having a moisture content of 5.2% by weight was passed continuously through a chamber to which is supplied vapors composed of a mixture of 70 weight percent of methyltrichlorosilane, 20 weight percent of dimethyldichlorosilane and 10 weight percent methyldichlorosilane in toluene. The toluene comprised 20 percent by volume of the total composition supplied to the chamber. On a molar basis the toluene comprises about 22 molar percent of the composition added to the chamber. The silane reactants were vaporized by being injected into the chamber as an aerosol. The dwell time of the paper in the chamber was 0.9 sec. and the chamber was maintained at 140°F. The silane and toluene comprised 1.86 volume percent of the atmosphere in the chamber. Following emergence from the chamber, the paper was passed through an oven to increase the paper surface temperature to about 200°F. The pH of the paper was measured as described in Example III and was 5.0. The paper was water repellent and retained substantially all of its strength characteristics.

EXAMPLE V

Following the procedure of Example IV, the treating chamber was maintained at a temperature of 110°F. The paper obtained was water repellent, had a pH 5.6 and retained substantially all of its strength characteristics.

EXAMPLE VI

The procedure of Example IV was followed except that the temperature in the treating chamber was 96°F and the chamber contained 9.0 volume percent of the silanes and toluene. The paper produced had a pH of 5.3 and was satisfactory in that it retained substantially all of its strength characteristics and was water repellent.

EXAMPLE VII

The procedure of Example IV was followed except that subsequent to treatment with silane and toluene, the paper was not heated but was allowed to cool to room temperature, the temperature in the chamber was 98°F and 2.4 volume percent of the silane and toluene was present in the chamber. The paper produced had a pH of 4.3 and was satisfactory in that it retained substantially all of its strength characteristics and was water repellent.

EXAMPLE VIII

Semibleached Kraft paper having a moisture content of 5.3% by weight was passed continuously through a chamber to which was supplied a mixture of vapors composed of 70 weight percent of methyltrichlorosilane, 20 weight percent of dimethyldichlorosilane and 10 weight percent of methyldichlorosilane. The dwell time of the paper in the chamber was about 1.5 seconds in an atmosphere comprising 5.9 volume percent of the silanes at 95°–97°F. Following the emergence of the paper from the treating atmosphere the paper was passed through an oven to increase the paper surface temperature to about 200°–250°F. The paper was satisfactory in that it was water repellent, retained substantially all of its strength characteristics and had a pH of 4.3.

EXAMPLE IX

The procedure of Example VIII was followed except that the dwell time of the paper in the treating chamber was 1.125 seconds, and the atmosphere in the chamber comprised 6.28 volume percent of the silanes. The treated paper, was water repellent, retained substantially all of its strength characteristics and had a pH of 4.1.

EXAMPLE X

The procedure of Example VIII was followed except that the dwell time of the paper in the treating chamber was 0.9 seconds and the atmosphere in the chamber comprised 11.2 volume percent of the silanes. The treated paper was water repellent, retained substantially all of its strength characteristics and had a pH of 4.5.

What is claimed is:

1. The process for rendering a cellulosic material water repellent which comprises contacting a cellulosic material having a water content between about 2 and 7 weight percent with vapors of a lower alkyl silicon halide which reacts with water to form a siloxane, maintaining the cellulosic material and lower alkyl silicon halide in contact between about 0.1 and 8 seconds, the concentration of lower alkyl silicon halide and the temperature at which the contact is conducted being maintained so that the cellulosic material contacted with the lower alkyl silicon halide is rendered water repellent and has a pH greater than 2.5.

2. The process of claim 1 wherein the cellulosic material has a water content between about 4 and 6 weight percent.

3. The process of claim 1 wherein the contact time is between about 0.5 and 1.5 seconds.

4. The process of claim 1 wherein the cellulosic material is paper.

5. The process of claim 2 wherein the cellulosic material is paper.

6. The process of claim 3 wherein the cellulosic material is paper.

7. The process of claim 1 wherein the said cellulosic material is contacted with a mixture of vapors of the lower alkyl silicon halide and vapors of a solvent for the lower alkyl silicon halide which solvent is nonreactive with the lower alkyl silicon halide or the cellulosic material.

8. The process of claim 7 wherein the cellulosic material has a water content between about 4 and 6 weight percent.

9. The process of claim 7 wherein the contact time is between about 0.5 and 1.5 seconds.

10. The process of claim 7 wherein the cellulosic material is paper.

11. The process of claim 8 wherein the cellulosic material is paper.

12. The process of claim 9 wherein the cellulosic material is paper.

13. The process of claim 1 wherein the cellulosic material is removed from contact with the lower alkyl silicon halide and is heated to remove hydrogen halide from the cellulosic material prior to a substantial portion of said hydrogen halide being dissolved in water contained in the cellulosic material.

14. The process of claim 13 wherein the cellulosic material is paper.

15. The process of claim 1 wherein said lower alkyl silicon halide comprises a methylchlorosilane or a mixture of methylchlorosilanes.

16. The process of claim 4 wherein said lower alkyl silicone halide comprises a methylchlorosilane or a mixture of methylchlorosilanes.

17. The process of claim 7 wherein said lower alkyl silicon halide comprises a methylchlorosilane or a mixture of methylchlorosilanes.

18. The process of claim 10 wherein said lower alkyl silicon halide comprises a methylchlorosilane or a mixture of methylchlorosilanes.

19. The process of claim 13 wherein said lower alkyl silicon halide comprises a methylchlorosilane or a mixture of methylchlorosilanes.

20. The process of claim 14 wherein said lower alkyl silicon halide comprises a methylchlorosilane or a mixture of methylchlorosilanes.

* * * * *